Jan. 24, 1956
M. M. SHUSTER
2,731,727
ADJUSTABLE RING, PLUG AND RADIUS GAGES
Filed Aug. 16, 1951
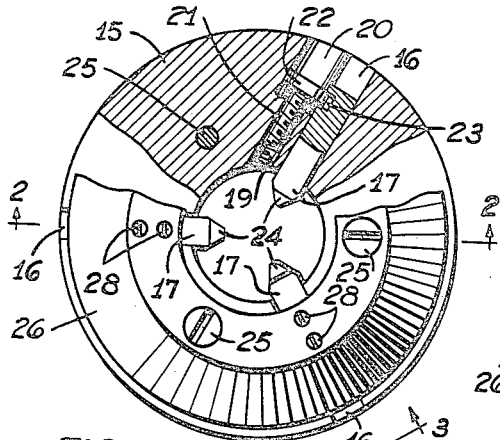
FIG. 1
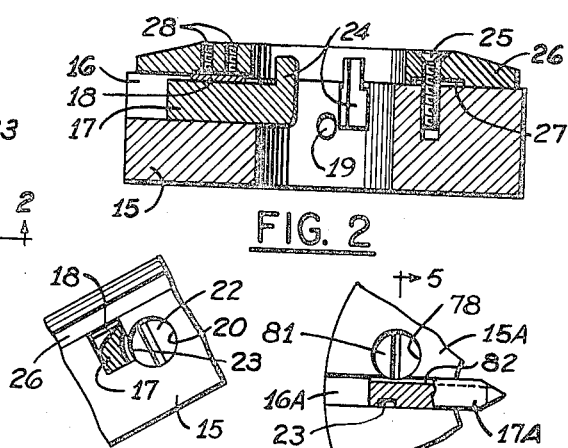
FIG. 2
FIG. 3
FIG. 4
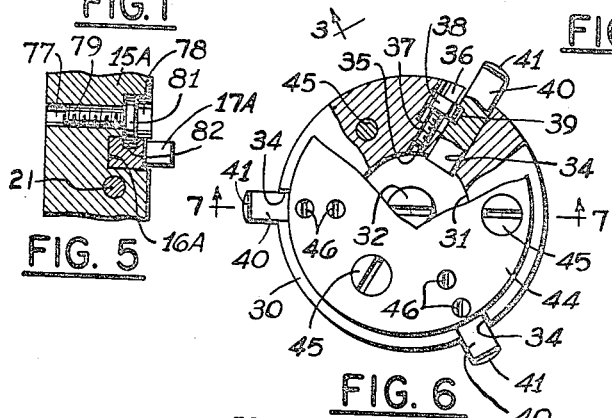
FIG. 5
FIG. 6
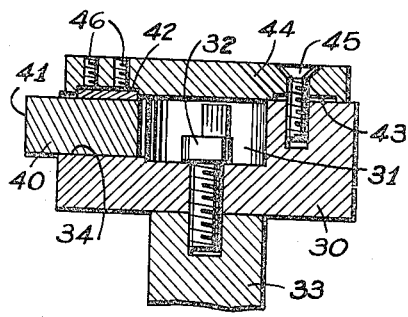
FIG. 7
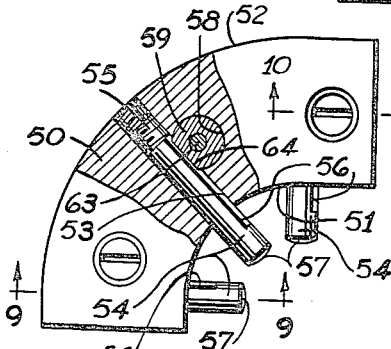
FIG. 8
FIG. 9
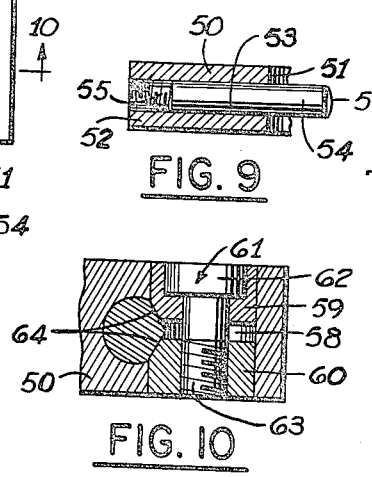
FIG. 10
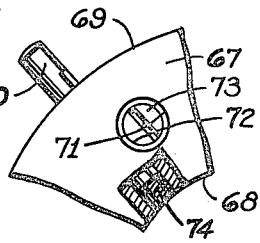
FIG. 11
INVENTOR.
MYER M. SHUSTER
BY
G. J. Kessenich, A. W. Dew & H. J. Forman
ATTORNEYS:

United States Patent Office 2,731,727
Patented Jan. 24, 1956

2,731,727
ADJUSTABLE RING, PLUG, AND RADIUS GAGES

Myer M. Shuster, Philadelphia, Pa.

Application August 16, 1951, Serial No. 242,168

11 Claims. (Cl. 33—178)

(Granted under Title 35, U. S. Code (1952), sec. 266)

The invention described in the following specification and claims may be manufactured and used by or for the Government for governmental purposes without the payment to me of any royalty thereon.

My invention pertains broadly to inspection gages used in mass production industries to determine dimensional accuracy of manufactured objects. In particular, it has reference to that type of adjustable inspection gages used in determining the dimensional accuracy of cylindrical parts, of bores, and also to that type of inspection gages used in determining the dimensional accuracy of convex or concave objects. It should not be assumed, however, that my invention has reference only to the types of gages just particularized. Indeed, as the description of the invention proceeds, it will become obvious, to those skilled in the art, that the principles of my invention are coextensive to adjustable gages for determining the dimensional accuracy of non-circular objects and openings (e. g. triangular, quadrilateral, polygonal, and the like). It is believed, however, that a description of my invention as relating to gages for use on cylindrical parts, on bores, and on convex or concave objects will permit simplicity of disclosure, but, at the same time, will be sufficient to enable anyone skilled in the art to apply the principles of the invention to gages for use on noncircular objects.

Those familiar with the gaging art know that inspection gages have widespread use in mass production manufacturing practice in order to determine whether or not the manufactured products conform dimensionally to predetermined acceptable specifications. In order to eliminate the necessity of having actually to measure the dimension, or dimensions, of these products, inspection gages are made to indicate quickly, when applied to an object, whether or not the object is acceptable from a dimensional standpoint. Thus, inspection gages, instead of being used to measure dimensions, are used instead, to check them against some standard.

It is common practice in using inspection gages to have separate "go" and "not go" gages, or to have the "go" and "not go" gages for checking a given dimension incorporated into a single gage. As those skilled in the art know, a manufactured object is acceptable dimensionally if the "go" gage fits on or into (as the case may be) the object being checked, and is unacceptable if the "not go" gage fits the object.

Since this application is, arbitrarily and for reasons of simplicity of disclosure, concerned chiefly with determining the external dimensional accuracy of cylindrical parts such as shafts, gun barrels, and the like; the internal dimensional accuracy of cylindrical openings such as piston chambers, gun bores, and the like; and the dimensional accuracy of convex protuberances and concave depressions, the scope of this description need embrace only that portion of the gaging art related thereto.

Before my invention, inspection gages used to check the dimensional accuracy of the earlier named objects were single purpose, non-adjustable tools, each gage having been made especially to check only one dimension. With such a system, it is easy to understand that the manufacture and maintenance of inspection gages was quite an expensive item in the budget for manufacturing any product which is to be gaged therewith. For a long time those associated with the gaging art have been aware of the desirability of both simplifying gaging practice and reducing gage manufacturing costs, but, until the development of my inventive gages, the need for simplicity and economy was unfilled.

In practicing my invention, I provide an accurately dimensioned gage body in which adjustably positionable gaging members are slidably mounted. Each gaging member is capable of projecting from the accurately finished body an amount depending upon the size of the gage body and the available slidability of the gaging member. In use, each gaging member is accurately set so as to project an equal distance from the gage body. This feature is of great advantage in that, among other things, each gage is adjustable so as to be capable of checking any dimension within a certain range, depending upon the gage's body size, instead of being good for only one dimension as practiced in prior art inspection gages. Another advantage of my inventive gages is that, in order to check any dimension falling within a certain range, it is only necessary to obtain a gage body covering that range and to set the gaging members accordingly in relation thereto.

My gages are also of great value in that the parts subjected to wear are easily replaceable by other gaging members, when necessary, so that the body of the gage, which is relatively the most expensive part, is subjected to considerably less wear and therefore has greatly prolonged life.

A full understanding of my invention and an appreciation of its novelty will become evident in the more detailed description which follows.

One object of my invention is to provide inspection gages which are adjustable so as to be employable throughout a wide range of dimensional variation.

Another object of my invention is to provide inspection gages which are less expensive and yet have greatly expanded use over conventional gages.

Still another object of my invention is to provide inspection gages in which the parts subject to actual wear are either adjustable or replaceable at comparatively negligible cost in relation to the bodies of the gages.

A further object is to simplify the gage making practice and gaging art.

The foregoing and other objects and advantages of my invention will become apparent from an inspection of the following description and the accompanying drawings wherein:

Fig. 1 is a top view, partly in section and partly broken away, of my unique adjustable ring gage, which has illustratively been drawn to full scale of an actual model thereof;

Fig. 2 is a vertical cross section taken along line 2—2 of Fig. 1 and showing further details of this gage.

Fig. 3 is a partial side view as seen from line 3—3 of Fig. 1, and showing means provided for moving the gage members radially inward or outward;

Fig. 4 is a representative portion of a top view of a modified form of the Fig. 1 gage showing a modified means of clamping the gaging members therein;

Fig. 5 is a vertical cross section taken along line 5—5 of Fig. 4, and showing further details of the modified clamping means;

Fig. 6 is a top plan view, partly in section and partly broken away, of my novel adjustable plug gage;

Fig. 7 is a vertical cross section taken along line 7—7 of Fig. 6 and showing further details of the adjustable plug gage;

Fig. 8 is a plan view, partly broken away and partly in section, of my inventive adjustable radius gage for measuring convex radii;

Fig. 9 is a vertical cross section taken along line 9—9 of Fig. 8 and showing further gage details;

Fig. 10 is a vertical cross section taken along line 10—10 of Fig. 8 and showing details of the means provided for maintaining the gaging members in position; and Fig. 11 is a plan view of a representative portion of the Fig. 8 gage when adapted for measuring concave radii.

From the figures it will be evident that my adjustable ring, plug, and radius gages are akin to each other in that the bodies of the ring and plug gages are circular rings, and in that the body of the radius gage is a portion of a circular ring. As stated earlier herein, it will later become evident, as the description proceeds, that the gage bodies may have shapes other than circular or arcuate without changing the complexion of my invention concepts. However, an explanation of the gages having circular or arcuate bodies will be sufficient to illustrate my invention.

*Adjustable ring gage*

Figs. 1, 2, and 3 illustrate my novel adjustable ring gage which is primarily used to check the outside diameter of cylindrical objects. In those figures it can be seen that this gage consists of a ring-shaped body 15 which is accurately finished so that its inside and outside diameters are precisely constant and concentric. These diameters will later be referred to as the basic inside and the basic outside diameters, respectively. Cut into one face of this body are three, or any other odd numbr of, radially extending grooves 16 each of which slidably accommodates an adjustably positioned gaging member 17. In Figs. 2 and 3 it can be seen that the depth of these radial grooves is slightly greater than the gaging member's height so that each groove will also serve as a guide for a clamping plate 18, later to be described.

Adjacent and parallel to each radially extending groove 16 are concentric openings 19 and 20 which are so positioned in relation to the radially extending grooves that the axis of these holes is somewhat above the bottom of the groove, and also, so that larger opening 20 overlaps the outer portion of the groove (see Figs. 1 and 3). In Fig. 1 it can be seen that recess 19 is threaded so as to accommodate the body 21 of an adjusting screw whose head 22 is accommodated in recess 20. In Figs. 1 and 3 it can be seen that the head of the adjusting screw engages a groove 23 located near the outer end of each gaging member. Movement of the adjusting screw in or out of gage body 15 results in corresponding movement of the respective gaging member. In order to facilitate ready application of the gage to, and its removal from the workpiece whose dimensional accuracy is to be checked, the gaging portion 24 of each gaging member 17 can be conveniently shaped as desired.

Secured, as by screws 25, to gage body 15 across the top of radially extending grooves 16 is a ring-shaped cover plate 26 (see Figs. 1 to 3). As a matter of convenience in in use the cover plate's outside diameter is somewhat smaller than the gage body's basic outside diameter; furthermore, the cover plate's inside diameter is slightly larger than the gage body's basic inside diameter (see Figs. 1 and 2). Cut into the surface of the cover plate adjacent the gage's body is a circular groove 27 which is sufficiently wide, as shown in Fig. 2, to accommodate the earlier mentioned clamping plate 18 which rests atop each gage member and extends into the groove. Although the cover plate is securely fastened to the gage's body, nevertheless sufficient clearance exists for each clamping plate 18 so that gaging members 17 are free to slide axially inward or outward. When the gaging members are set in position to check a cylindrical dimension, they may be secured in that position by means of clamping screws 28. From Fig. 1 it is easy to see that with the illustrated size of body 15 shown, it is possible adjustably to position the gaging arms in relation to the gage body so as to measure any diameter from approximately 1/16 of an inch to 1 inch. By having a gage body made any arbitrary size, it is easy to understand that any other range can be made possible. As a matter of convenience, I find it preferable to stamp or otherwise mark each gage body with the body's basic inside and outside diameters as well as with the actual minimum and maximum diameters between which the particular gage may be used.

It is also apparent from Fig. 1 that gaging members 17 will be subjected to the wear resulting from use of the gage. These gaging members, although amenable to either resetting or refinishing as a result of wear, can finally be replaced at very little expense. The gage body, on the other hand, can be used almost indefinitely without becoming appreciably worn. From the standpoint of the expense involved in replacing worn parts, it can be seen that with my gage the expense would be quite negligible compared with the expense of having to replace the entire gage body as is necessary with conventional ring gages.

*Setting and use of the adjustable ring gage*

My novel ring gage is prepared for checking the outside diameter of cylindrical objects by setting each of the gaging members so as to project an equal amount from the gage body's basic inside diameter. From Fig. 1 it can be understood that if each of the gaging members is set a certain distance from a point on the basic inside diameter which is diametrically opposite each of the gaging members, each of the gaging members will be the same dimension away from the center of that basic diameter, and will also determine a circle which is concentric with the gage's basic inside diameter.

In setting the gaging members to check a certain dimension, it is first necessary to loosen clamp screws 28 so that the gaging members can be positioned properly in relation to the basic diameter by rotation of the adjusting screws. Setting the gaging members in proper position relative to the gage body's basic inside diameter can be done in any convenient manner, but the method I prefer is to use an inside measuring micrometer, a precision gage block and precision rolls, or some similar means. For example, assume that a shaft diameter of 0.875 inch is to be checked and that the gage body's basic inside diameter is 1.0000 inch. By simple arithmetic it can be computed that each gaging member should project 0.0625 inch (half the difference between the 1.0000 inch basic inside diameter and the 0.875 shaft diameter to be checked) from the basic inside diameter. Therefore, each gaging member is set so that a dimension of 0.9375 (the difference between the 1.0000 inch basic inside diameter and the 0.0625 inch dimension) is obtained between the projecting tip of each gaging member and the body's basic inside diameter. From this it can be seen that the tips of the gaging members determine a circle concentric with the gage body's basic inside diameter and having a diameter of 0.875 inch. After the gaging members are properly positioned, clamp screws 28 are tightened against clamp plate 18 to maintain the gaging members in place.

This 0.875 inch dimension, it must be understood, has been chosen for illustrative purposes only. Actually, that figure is but one of a great number of dimensions which could be checked, with my inventive adjustable ring gage of the illustrated or other suitable size.

*Adjustable plug gage*

It will be evident from Fig. 1 that the adjustable ring gage, by merely reversing the position of the gaging members so that the gaging portions thereof extend outside the body of the gage, can be used as an adjustable plug gage. However, a more preferable form of my adjustable plug gage is shown in Figs. 6 and 7. From those figures it can be seen that the adjustable plug gage is substantially the same as the adjustable ring gage, but that, to the adjustable plug gage, I have added a handle in order that the gage can be used more easily.

It is well known to those skilled in the art that this type of gage is used in checking the dimensional accuracy of internal diameters such as those found in gun bores, piston chambers, and the like.

In Figs. 6 and 7 it can be seen that my adjustable plug gage comprises a circular body 30 whose outside diameter is accurately finished to any convenient diameter which will later be referred to as the "basic" diameter. Centrally positioned in gage body 30 is the recess 31 in which can be seen a screw 32 by means of which a handle 33 is secured to the gage body (see Fig. 7). Cut into the same surface of the gage body as axial recess 31 are three, or any other odd number of radially extending grooves 34 whose depth, as shown in Fig. 7, is slightly less than the depth of axial recess 31. Adjacent and parallel to each groove 34 are concentric openings 35 and 36. In Fig. 6 it can be seen that opening 35 is threaded and accommodates the body 37 of an adjusting screw whose head 38 is accommodated in recess 36.

In a manner similar to that described for my adjustable ring gage, the head of each adjusting screw is accommodated in a groove 39 in each gaging member 40 which is adjustably slidable in the gage body as a result of moving adjusting screw 37—38 inward or outward (see Fig. 6). Each gaging member has a gaging portion 41 which, it is well known, can be shaped in any convenient manner desired. In Fig. 7 it can be seen that the radial grooves are somewhat deeper than the height of the gaging members accommodated therein, and that each groove also accommodates a clamp plate 42 whose thickness is somewhat greater than the difference in depth between the gaging members and the depth of the radially extending grooves.

The portion of each clamp plate extending above the surface of the gage body is accommodated in a circular groove 43 which is located in the undersurface of a top plate 44 (see Fig. 7). This top plate is securedly attached, as by screws 45, to gage body 30 (see Figs. 6 and 7). It can also be seen in those figures that the diameter of the top plate is somewhat less than the diameter of the gage body, so as not to cause interference during the use of my gage.

Although the top plate is securedly fastened to the gage body, nevertheless there is sufficient clearance between the plate's circular groove 43 and clamp plates 42 so that each gaging member is slidably positionable radially inward or outward in relation to the gage body's basic diameter. When these gaging members have been set in position for checking a certain diameter, the clamp plates are pressed against the gaging members, thereby holding them securely in place, by means of clamp screws 46 which are threadedly engaged with the top plate (see Figs. 6 and 7).

Those skilled in the art will realize from the description thus far that the gaging members can be positioned outside the gage's basic diameter so as to check bore diameters and like dimensions over a wide range of measurement. For example, with a gage body of the diameter represented in Fig. 6, it is possible to check internal diameters ranging from approximately 2 to 3 inches. Therefore, it can be seen that one gage can be used to check dimensions over a wide range of measurement, instead of having to use one non-adjustable gage for each dimension to be checked, as was necessary with prior art plug gages. It is also understandable that the gage body can initially be made any convenient basic diameter, and that the gaging arms can be any convenient length so that the range of dimensions through which the gage can be used is a matter entirely at the discretion of the gage maker. As in the case of my adjustable ring gage, I find it preferable to stamp or otherwise mark each gage body with its basic diameter and with the actual minimum and maximum diameters between which the particular gage may be used.

Setting and use of the adjustable plug gage

In setting my adjustable plug gage to check a bore diameter falling within the dimensional scope of a particular gage each gaging member is set an equal distance outside the gage body's basic diameter. This is done by loosening clamp screws 46 associated with each gaging member, and by moving each gaging member radially in or out by means of the respective adjusting screw, until the member projects the required amount from the basic diameter. Setting the gaging members to so project can be done in any convenient manner, but the method I prefer is to use a micrometer caliper, or other precision measuring instrument, to "mike" across the tip of each gaging member and the gage body's basic diameter. For example, assume that a bore diameter of 2.870 inches is to be checked and that the gage body's basic diameter is 2.000 inches. By simple arithmetic it can be computed that each gaging member should project one-half the difference in distance between the two diameters, or 0.4350 inch from the basic diameter. Therefore, each member is positioned so that, as determined by a precision measuring instrument, a total dimension of 2.4350 inches (the sum of the gage's 2.0000 inch basic diameter plus the 0.4350 inch dimension) is obtained across the tip of each gaging member and the gage body's basic diameter. From this it can be seen that the tips of the gaging members determine a circle concentric with the gage's body and having a diameter of 2.870 inches. Once the gaging members are properly positioned, clamp screws 46 are tightened against clamp plates 42 to maintain the gaging members in place.

It must be understood that the dimensions mentioned above have been chosen only for illustrative purposes. Actually the 2.870 inch dimension is but one of a great number of dimensions which could be checked with my inventive plug gage illustratively having a basic diameter of 2.0000 inches.

This manner of setting the adjustable plug is likewise applicable, if it should be desired to adapt my adjustable ring gage for checking bore diameters. In that case, each gaging member is positioned so as to project an equal amount from the gage body's outside basic diameter.

Adjustable convex radius gage

In order to check the convexity of an object, I have provided the unique adjustable radius gage shown in Figs. 8, 9, and 10. As shown in those figures, this gage comprises a body 50 whose inner and outer arcuate surfaces 51 and 52 are accurately finished in constant and concentric relationship to each other. Later, these inner and outer arcuate surfaces will be referred to as the inner basic radius and the outer basic radius, respectively. In radial alignment with the axis of these two arcuate surfaces is a plurality of radially extending openings 53 each of which slidably accommodates a cylindrical or other shaped gaging member 54. As shown in Figs. 8 and 9 the outer portion of these openings is threaded to accommodate an adjusting screw 55. From the drawings it can be seen that each gaging member is provided with converging, longitudinally extending flats 56 and a conveniently shaped gaging portion 57. Extending through the gage's body adjacent each gaging member and perpendicular thereto is an opening 58 which accommodates the clamping bushings 59 and 60 (see Fig. 10). As there shown, these bushings can be drawn toward each other by means of a clamp screw 61 whose head 62 is accommodated in bushing 59 and whose body 63 is threadedly joined to bushing 60. In Figs. 8 and 10 it can be seen that the inner opposed bases of the clamp bushings are provided with a beveled flat 64 which contacts flats 56 on the gaging members. It can be seen that by means of the clamping bushings and screws the gaging members can be securely maintained in position. If so desired, however, the gaging members can be secured in position by other conventional means.

*Setting and use of the adjustable convex radius gage*

As in the case of the other two gages earlier described, my adjustable convex radius gage is prepared for use by setting the tip of each gaging member an equal distance from the inner basic radius. This is done by loosening clamp screws 61 and moving each gaging member radially in or out in relation to gage body 50 until each member projects the required amount from the inner basic radius. Setting of the gaging members can be done in any convenient manner, but the method I prefer is to use a micrometer caliper or other precision measuring instrument, to measure across the tip of each gaging member and the gage body's outer basic radius. For example, suppose a convex object should have a radius of 0.400 inch and that the gage's inner basic radius is 0.8750 inch while its outer basic radius is 2.0000 inches. By using simple arithmetic it can be computed that each gaging member should project 0.4750 inch (the difference between the gage's inner basic radius of 0.8750 inch and the 0.400 inch radius convexity to be checked) from the gage's inner basic radius or be 0.4750 inch plus 1.1250 inches (the difference between the gage's 0.8750 inch inner and its 2.0000 inch outer basic radii) or 1.6000 inches from the gage's outer basic radius. Therefore, each gaging member is positioned so that, with a precision measuring instrument, a dimension of 1.6000 inches is obtained across the projecting tip of each gaging member and the gage's outer basic radius. From this it can be seen that the ends of the gaging members determine a circle having a radius of 0.400 inch. Once the gaging members are properly positioned, clamp screws 61 are tightened to hold them securely in place. The gage can then be held against the object whose convexity is to be checked. If all the gaging members contact the convexity, its radius is the same as that to which the gaging members are set, namely 0.400 inch.

Remember that all dimensions here mentioned have been arbitrarily chosen for illustration only. Actually, the 0.400 inch radius is but one of many dimensions to which the particular illustrative gage could be set.

On the basis of well known geometric principles, a minimum of three gaging members must be used in this gage, but for checking large pieces any convenient number greater than three can be chosen.

From the description it will be apparent that with a gage body of any given size, a wide range of dimensions may be checked by adjusting the gaging ends inwardly or outwardly as necessary. Thus, this one gage replaces a large number of non-adjustable gages used for checking each individual dimension as was necessary with prior art gages.

*Adjustable concave radius gage*

It will be evident from Figs. 8 and 9 that the adjustable convex radius gage just described could easily be converted for use as an adjustable concave radius gage by merely reversing the position of the gaging members so that the gaging portions thereof project from the gage body's outer basic radius instead of from its inner basic radius. However, a more preferable form of my adjustable concave radius gage is illustrated in Fig. 11 where a typical portion is shown. In that gage I have provided a body 67 whose inner and outer arcuate surfaces 68 and 69, respectively, are accurately finished in constant and concentric relationship to each other and are known as the inner and outer basic radii, respectively.

As in the case of the adjustable convex radius gage, this body is provided with three or more radially extending recesses for the shaped gaging members 70, and with openings 71 for clamping bushings 72 which are secured together by the clamp screws 73. The only difference between my adjustable convex and concave radius gages is that the radially extending openings accommodating the gaging members are threaded at their inner extremities to accommodate the adjusting screw 74 (see Fig. 11). However, if desired, the radially extending openings may be threaded at both their inner and outer ends. In that case, one gage could be used to check both convex and concave objects as earlier mentioned.

*Setting and use of the adjustable concave radius gage*

From the drawings and the description thus far, it is evident that my adjustable concave radius gage is closely related to the earlier mentioned adjustable convex radius gage. Setting of the concave radius gage is effected by having each gaging member project an equal amount from the gage body's outer basic radius. This setting is accomplished by using a micrometer caliper or other accurate measuring instrument to set the distance from the inner basic radius to the outer end of the gaging member, and can best be understood from an illustrative example. Suppose a concavity of 2.503 inches were to be checked, and that the gage's inner and outer basic radii were 1.0000 and 2.0000 inches, respectively. By the use of simple arithmetic it can be computed that the tip of each gaging member should project 0.5030 inch (the difference between the gage's 2.0000 inch outer basic radius and the 2.503 inch radius of the concavity to be checked) from the gage body's outer basic radius, or, in other words, be 1.503 inches (the difference, 1.0000 inch, between the gage's basic radii plus the 0.5030 inch dimension) from the body's inner basic radius. Therefore, after loosening the respective clamping screws 73, each gaging member is positioned so that, with any convenient precision measuring instrument, a dimension of 1.503 inches is obtained across the projecting tip of each gaging member and the body's inner basic radius. From this it can be seen that the ends of the gaging members determine a radius of 2.503 inches which is concentric with the gage body's inner and outer basic radii. After the gaging members are properly positioned they are securely held in place by tightening respective clamp screws.

After the gaging members have been secured in position, the gage is placed against the concavity whose radius is to be checked so that the tips of the gaging members are directed toward the concavity. If all the gaging members contact the concavity, its radius is 2.503 inches.

Remember that all dimensions here mentioned have been chosen for illustrative purposes only. In actuality the 2.503 inch dimension is but one of many which could be checked by use of my inventive adjustable concave radius gage having the arbitrary inner and outer basic radii stated. In other words, one of my adjustable convex radius gages will replace a great number of conventional non-adjustable concave radius gages. By having a series of comparatively few adjustable concave radius gages, the basic radii of whose bodies are carefully inter-related, it would be possible to check any one of an almost infinite number of various dimensions.

As a matter of convenience I find it practical to stamp, or otherwise, mark, each gage body with the body's inner and outer basic radii and with the minimum and maximum convex and concave radii between which each particular gage can be used.

*Modified means for holding the gaging members in place*

As an alternate method of securing each gaging member in proper position within a gage body after having been positioned to check a certain dimension, I have provided the means shown in Figs. 4 and 5. This means of fastening the gaging members can be used with equal facility in either the adjustable ring, the adjustable plug, or the adjustable radius gages. However, for illustrative purposes, it will be described as being embodied in the Fig. 1 adjustable ring gage. In Figs. 4 and 5 it can be seen that I have provided the gage body 15A with concentric openings 77 and 78 adjacent and perpendicular to each radially extending groove 16A. Inasmuch as body 15A is partially shown and inasmuch as the Fig. 4 gage has reference, for illustrative purposes, as earlier stated, to the Fig. 1 gage, it will be understood, by those skilled in the art, that body 15A, if shown in its entirety, would be a circular ring similar to body 15 shown completely in Fig. 1; that body 15A, if shown completely, would be provided with at least three gaging members, as is the body in the Fig. 1 gage; and that each gaging member is intended to be provided with the same type of adjusting screw as shown completely in the Fig. 1 gage. That the gage partially shown in Fig. 4 is, actually, provided with the same type of adjusting screw as used in the Fig. 1 gage will be apparent from Figs. 4 and 5, wherein the former figure shows groove 23 which engages with the adjusting screw, as explained earlier; and wherein the latter figure shows body portion 21 of the adjusting screw. Opening 77 is threaded and accommodates the body 79 of a clamping screw whose head 81 is accommodated in recess 78. Note also in Figs. 4 and 5 that the head of each clamping screw extends somewhat inside the respective radially extending groove containing the gaging member 17A, and also that each gaging member is provided with a longitudinal groove 82 which fits around the clamp screw's head. From the description it is easy to see how, by tightening or loosening the clamp screw, each gaging member will be slidable within or securely clamped in the gage body.

Summary

During this discussion of my novel adjustable gages no reference has been made to the "go" and "not go" aspect of the gaging procedure. This has been done because those skilled in the art know that "go" and "not go" gages can either be separate, or can be incorporated into one gage by well known means.

From the foregoing it will be apparent that I have provided gages for determining the dimensional accuracy of circular and other dimensions which gages are adjustable so as to be employable throughout a wide range of dimensional variation, that I have provided gages for determining the dimensional accuracy of circular and other dimensions which gages are less expensive and have greatly expanded use over conventional gages, that I have provided gages for determining the dimensional accuracy of circular and other dimensions in which the parts subject to actual wear in use are easily replaceable at comparatively negligible cost in relation to the gages' bodies, and that by providing my novel gages for determining the dimensional accuracy of circular and other dimensions I have simplified gage making practice and gaging art.

Those skilled in the art know that my inventive concepts are amenable to extensive variation and modification without departing from their original spirit and scope. For example, and as earlier mentioned herein, the gage bodies may have forms or shapes other than the circular shapes shown in the drawings; and the means for adjusting and clamping the gaging members may be freely interchanged with each other in the various types of gages disclosed herein. For that reason I do not wish to be limited by the narrow confines attendant the embodiments here presented for illustrative purposes only, but rather by the metes and bounds of the appended claims.

I claim:

1. In a device for checking the external cross-sectional dimensions of non-circular objects, the combination of a gaging body having therein a cavity whose contour is identical to but larger than that of the objects being checked, gaging members selectively positioned in said body around the periphery of said body's cavity and adjustably positionable so that the gaging ends thereof project selectable equal amounts into the body's cavity, and a headed adjusting screw in said body for each said gaging member and mounted adjacent thereto, each screw being movable in a direction paralleling the movement of its adjacent gaging member and engageable therewith so that movement of each said screw will move the corresponding adjacent gaging member in the same direction relative to said body's cavity, whereby the gaging ends terminate on lines which form the contours of the objects being checked.

2. In a device for checking the internal cross-sectional dimensions of non-circular openings, the combination of a gaging body whose contour is identical to but smaller than that of the openings being checked, gaging members selectively positioned in said body around its periphery and adjustably positionable so that the gaging ends thereof project selectable equal amounts from the body, a headed adjusting screw in said body for each said gaging member and mounted adjacent thereto, each screw being movable in a direction paralleling the movement of its adjacent gaging member and engageable therewith so that movement of each said screw will move the corresponding adjacent gaging member in the same direction relative to said body's contour, and a headed locking screw in said body for each of said gaging members, the head of each locking screw engaging a shoulder in each respective said gaging member so that each gaging member can be selectively secured in said body, whereby the gaging ends terminate on lines which form the contours of the openings being checked.

3. In a device for checking the external diametral dimensions of cylindrical objects, the combination of a gaging body having therein a cylindrical cavity whose diameter is larger than that of the objects being checked, at least three adjustably positionable gaging members spaced around said body's cavity so as to project selectable equal amounts into the body's cavity, the ends of said gaging members terminating on circumferential lines which form the contours of the objects being checked, and a headed adjusting screw in said body for each said gaging member and mounted adjacent thereto, each screw being movable in a direction paralleling the movement of its adjacent gaging member and engageable therewith so that movement of each said screw will move the corresponding adjacent gaging member in the same direction along a radial line with relation to the center of said body's cylindrical cavity.

4. In a device for checking the internal diametral dimension of cylindrical openings in objects, the combination of a cylindrical gaging body whose external diameter is smaller than that of the openings being checked, at least three adjustably positionable gaging members spaced around said body's periphery so as to project selectable equal amounts therefrom, the ends of said gaging members terminating on circumferential lines which form the contours of the openings being checked, a headed adjusting screw in said body for each said gaging member and mounted adjacent thereto, each screw being movable in a direction paralleling the movement of its adjacent gaging member and engageable therewith so this movement of each said screw will move the corresponding adjacent gaging member in the same direction along a radial line with relation to the center of said body, and a headed locking screw in said body for each of said gaging members, the head of each locking screw engaging a shoulder in each respective said gaging member so that each gaging member can be selectively secured in said body 5. In a device for checking the curvature of convex surfaces, the combination of a body having extending thereinto from its periphery a concave cavity of curvature identical to but with a radius greater than those of the curvatures being checked, at least three adjustably positionable gaging members spaced around the periphery of the body's concave cavity and positionable so as to project selectable equal amounts therefrom, the ends of said gaging members terminating on circumferential lines which form the contours of the convex surfaces being checked, a headed adjusting screw in said body for each said gaging member and mounted adjacent thereto, each screw being movable in a direction paralleling the movement of its adjacent gaging member and engageable therewith so that movement of each said screw will move the corresponding adjacent gaging member in the same direction along a radial line with relation to the center of said body's cavity, and a headed locking screw in said body for each of said gaging members, the head of each locking screw engaging a shoulder in each respective said gaging member so the each gaging member can be selectively secured in said body 6. In a device for checking the curvature of concave surfaces, the combination of a body having a convex surface of curvature identical to but with a radius smaller than those of the curvatures being checked, at least three adjustably positionable gaging members spaced around the periphery of the body's convex surface and positionable so as to project selectable equal amounts therefrom, the ends of said gaging members terminating on circumferential lines which form the contours of the concave surfaces being checked, and a headed adjusting screw in said body for each said gaging member and mounted adjacent thereto, each screw being movable in a direction paralleling the movement of its adjacent gaging member and engageable therewith so that movement of each said screw will move the corresponding adjacent gaging member in the same direction along a radial line with relation to the center of said body's convex surface 7. The combination, in a dual-purpose gage for checking the external cross-sectional dimensional accuracy of non-circular objects and for alternatively checking the internal cross-sectional dimensional accuracy of non-circular openings substantially identically shaped but of larger size than the external cross-sections of the non-circular objects, of: a body having a basic inside reference contour larger in size than but identical in shape with that of the objects whose external cross-sectional dimensional accuracy is to be checked, and also having a basic outside reference contour smaller in size than but identical in shape with that of the openings whose internal cross-sectional dimension accuracy is to be checked; gaging members in said body, each member being adjustably positionable to project selectable substantially equal amounts from said body's basic inside reference contour thereby to be usable for checking the external cross-sectional dimensional accuracy of objects identical in shape therewith, but smaller than said body's basic inside reference contour, and also alternatively positionable to project selectable substantially equal amounts from said body's basic outside reference contour thereby to be usable for checking the internal cross-sectional dimensional accuracy of openings identical in shape therewith, but larger than said body's basic outside reference contour, and a headed adjusting screw in said body for each gaging member and mounted adjacent thereto, each screw being movable in a direction paralleling the movement of its adjacent gaging member and engageable therewith so that movement of each of said screws will move the corresponding adjacent gaging member relative to said body's basic inside and basic outside reference contours.

8. In a dual-purpose gage for checking the external, cross-sectional, dimensional accuracy of a cylindrical plug and for alternatively checking the internal, cross-sectional, dimensional accuracy of a cylindrical bore, the combination of: a body in the form of a circular ring whose opening defines a basic inside reference diameter of somewhat greater dimension than the cylindrical plug and whose outer circumference defines a basic outside reference diameter of somewhat less dimension than the cylindrical bore; an odd plural number of gaging members each of which is radially slidable in a corresponding groove therefor in one face of said body, and each gaging member being adjustably positionable radially so as selectively to project a substantially equal amount from said body's basic reference diameters; a cover plate on said body removably secured thereto over the grooves therein enabling ready access for installing or servicing said gaging members; a headed adjusting screw in said body for each gaging member and mounted adjacent thereto, each screw being movable in a direction paralleling the movement of its adjacent gaging member and engageable therewith so that movement of each of said screws will move the corresponding adjacent gaging member in the same direction along a radial line with relation to the center of said circular body; and a locking screw extending through said cover plate for each of said gaging members for applying pressure required to retain them in a predetermined position; whereby the external cross-sectional dimensional accuracy of a cylindrical plug smaller than said body's basic inside reference diameter can be checked when said gaging members are adjustably positioned so as to project radially inwardly substantially equal amounts from the body's basic inside reference diameter, and whereby the internal cross-sectional dimensional accuracy of a cylindrical bore larger than said body's basic outside reference diameter can alternatively be checked when said gaging members are adjustably positioned so as to project radially outwardly substantially equal amounts from said body's basic outside reference diameter.

9. The dual-purpose gage of claim 8 additionally including a clamping plate between each locking screw and its corresponding gaging member for aiding retention of the gaging members in a predetermined position without injury thereto causable by application of pressure to the gaging members.

10. In a dual-purpose gage for checking the external, cross-sectional, dimensional accuracy of a cylindrical plug and for alternatively checking the internal, cross-sectional, dimensional accuracy of a cylindrical bore, the combination of: a body in the form of a circular ring whose opening defines a basic inside reference diameter of somewhat greater dimension than the cylindrical plug and whose outer circumference defines a basic outside reference diameter of somewhat smaller dimension than the cylindrical bore; an odd plural number of gaging members each of which is radially slidable in a corresponding groove therefor in said body, and each gaging member being adjustably positionable radially so as selectively to project a substantially equal amount from said body's basic reference diameters; a headed adjusting screw in said body for each said gaging member and mounted adjacent thereto, each screw being movable in a direction paralleling the movement of its adjacent gaging member and engageable therewith so that movement of each said screw will move the corresponding adjacent gaging member in the same direction along a radial line with relation to the center of said circular body; and a headed locking screw in said body for each of said gaging members, the head of each locking screw engaging a shoulder in each respective said gaging member so that each gaging member is selectively secured in said body; whereby the external cross-sectional dimensional accuracy of a cylindrical plug smaller than the body's basic inside reference diameter can be checked when said gaging members are adjustably positioned so as to project radially inwardly a substantially equal amount from the body's basic inside reference diameter, and whereby the internal cross-sectional dimensional accuracy of a cylindrical bore larger than said body's basic outside reference diameter can alternatively be checked when said gaging members are adjustably positioned so as to project radially outwardly a substantially equal amount from said body's basic outside reference diameter.

11. In a dual purpose gage for alternatively checking the dimensional accuracy of internal and external contours, the combination of a body having inside and outside reference contours of identical shape but respectively of a size different from the internal and external contours whose dimensional accuracy is to be checked, gaging members in said body and positionable so as alternatively to project selectable equal amounts from said body's inside and outside reference contours, and headed adjusting screws in said body and disposed so that the respective screw's heads each operatively engage corresponding ones of said gaging members for moving the gaging members with reference to said body's reference contours.

References Cited in the file of this patent

UNITED STATES PATENTS

| | | |
|---|---|---|
| 470,912 | Durand | Mar. 15, 1892 |
| 1,034,795 | Helwig | Aug. 6, 1912 |
| 1,810,166 | Gallimore | June 16, 1931 |
| 2,210,124 | Parrish | Aug. 6, 1940 |
| 2,249,954 | Hellberg et al. | July 22, 1941 |
| 2,302,355 | Sumner | Nov. 17, 1942 |
| 2,356,133 | Van den Kieboom | Aug. 22, 1944 |
| 2,391,020 | Jackman | Dec. 18, 1945 |
| 2,488,684 | Rex | Nov. 22, 1949 |
| 2,594,143 | Fichter | Apr. 22, 1942 |